United States Patent

Kuriu et al.

(10) Patent No.: US 8,017,533 B2
(45) Date of Patent: Sep. 13, 2011

(54) STEEL PLATE REINFORCING SHEET

(75) Inventors: Atsushi Kuriu, Osaka (JP); Takio Itou, Osaka (JP); Hiroichi Ukei, Osaka (JP); Manabu Matsunaga, Osaka (JP)

(73) Assignee: Nitto Denko Corporation, Osaka (JP)

( * ) Notice: Subject to any disclaimer, the term of this patent is extended or adjusted under 35 U.S.C. 154(b) by 650 days.

(21) Appl. No.: 10/880,576

(22) Filed: Jul. 1, 2004

(65) Prior Publication Data

US 2005/0025955 A1 Feb. 3, 2005

(30) Foreign Application Priority Data

Jul. 4, 2003 (JP) .................................. 2003-192281
Jul. 4, 2003 (JP) .................................. 2003-192282

(51) Int. Cl.
*B32B 5/24* (2006.01)

(52) U.S. Cl. ...................... 442/221; 428/159; 428/304.4; 428/318.4; 428/500; 428/355; 442/149; 523/218; 524/571

(58) Field of Classification Search .................. 428/159, 428/304.4, 318.4, 500, 355; 523/218; 442/149, 442/221; 524/571
See application file for complete search history.

(56) References Cited

U.S. PATENT DOCUMENTS

| | | | |
|---|---|---|---|
| 5,660,901 A * | 8/1997 | Wong ............................ 428/35.7 |
| 6,359,094 B1 * | 3/2002 | Sera et al. ...................... 526/346 |
| 6,368,438 B1 * | 4/2002 | Chang et al. .................... 156/79 |
| H002047 H * | 9/2002 | Harrison et al. ........... 428/297.4 |
| 6,958,184 B2 * | 10/2005 | Tono et al. ..................... 428/212 |
| 2004/0067380 A1 * | 4/2004 | Maeda et al. .................. 428/500 |
| 2004/0221953 A1 * | 11/2004 | Czaplicki et al. ............. 156/293 |

FOREIGN PATENT DOCUMENTS

| | | |
|---|---|---|
| EP | 658603 A2 * | 6/1995 |
| EP | 0658603 A2 | 6/1995 |
| JP | HEI-5-111973 | 5/1993 |
| JP | 07-068695 | 3/1995 |
| JP | HEI-7-68696 | 3/1995 |
| JP | HEI-8-164591 | 6/1996 |
| JP | 09131831 * | 5/1997 |
| JP | HEI-10-76586 | 3/1998 |
| JP | WO0264673 * | 8/2002 |
| JP | 2002-283526 | 10/2002 |
| WO | WO 01/54893 | 8/2001 |
| WO | WO 01/88033 | 11/2001 |
| WO | WO 02064673 A1 * | 8/2002 |

* cited by examiner

*Primary Examiner* — D. Lawrence Tarazano
*Assistant Examiner* — Peter Y Choi
(74) *Attorney, Agent, or Firm* — Jean C. Edwards, Esq; Edwards Neils PLLC

(57) ABSTRACT

A steel plate reinforcing sheet includes a restricting layer and a reinforcing layer, the reinforcing layer being formed of foam composition including styrene synthetic rubber, aromatic epoxy resin, and a foaming agent. A total thickness of the restricting layer and reinforcing layer is not more than 3.5 mm, and the steel plate reinforcing sheet is formed to have adhesion at 5° C. to an oiled, cold-rolled steel plate of not less than 2.0N/25 mm and also has bending strength of not less than 18N after being heated at 160° C. for twenty minutes. This ensures both sufficient adhesion to the steel plate and sufficient reinforcement of the same steel plate. Thus, this steel plate reinforcing plate, when adhesively bonded to a steel plate used in a variety of industrial machines properly and then foamed, can provide an effective reinforcement of the steel plate by forming the steel reinforcing plate bonded to the steel plate.

12 Claims, 1 Drawing Sheet

STEEL PLATE REINFORCING SHEET

This application claims priority from Japanese Patent Application Nos. 2003-192281 and 2003-192282, both filed Jul. 4, 2003, the entire contents of which are herein incorporated by reference to the extent allowed by law.

BACKGROUND OF THE INVENTION

1. Field of the Invention

The present invention relates to a steel plate reinforcing sheet and, more particularly, to a steel plate reinforcing sheet used to be adhesively bonded to steel plate used in a variety of industrial machines such as transportation machines.

2. Description of the Prior Art

In general, a steel plate for a shell of an automotive vehicle is manufactured in the form of a thin sheet having a thickness generally in the range of 0.6 mm to 0.8 mm, for reduction in weight of a vehicle body. As is known, a steel plate reinforcing sheet is adhesively bonded to the inside of the steel plate, for the reinforcement purpose.

This steel plate reinforcing sheet is, for example, adhesively bonded and thermally foamed by using the heat generated at the time of the electrodeposition coating, to develop its reinforcing property in a fabrication process of the steel plate of the shell of the automotive vehicle. For example, JP Laid-open (Unexamined) Patent Publication No. Hei 7-68695 proposes a steel plate reinforcing sheet which comprises a restricting layer formed of glass fiber cloth and the like, and a foaming resin layer formed of material in which rubber, thermoplastic elastomer, inorganic filler, tackifier, softening agent, cross-linking agent, and foaming agent are mixed.

JP Laid-open (Unexamined) Patent Publication No. 2002-283526 proposes a thermally curable adhesive sheet for reinforcing a thin steel plate having a structure wherein uncured adhesive layers of epoxy resin composition having a adhesiveness at room temperature and containing a thermally decomposable foaming agent are laminated in layers on a base material layer of uncured epoxy resin composition.

Meanwhile, the steel plate for the shell of the automotive vehicle is often designed in a curved form. Due to this, the steel plate reinforcing sheet may also be required to be adhesively bonded to an irregularly curved surface, such as a two-dimensionally or three-dimensionally curved surface. Also, in the winter season, the steel plate reinforcing sheet may be required to be adhesively bonded under a low temperature of around 5° C. If the adhesion of the steel plate reinforcing sheet is insufficient, then the steel plate reinforcing sheet may fall off from the steel plate after it is adhesively bonded to the steel plate and before it is thermally foamed, inducing the disadvantage of reduction in working efficiency.

On the other hand, an attempt to ensure the sufficient adhesion of the steel plate reinforcing sheet requires reduction in viscosity of a bonded surface of the steel plate reinforcing sheet. However, the reduction of viscosity induces the disadvantage that the steel plate reinforcing sheet after thermally foamed may fail to develop its reinforcing property sufficiently.

Also, a reinforcing layer formed of epoxy resin as a base resin, including, for example, the above mentioned thermally curable adhesive sheet for reinforcing the thin steel plate and the like has the problem that it reduces in adhesion particularly to an oiled steel plate in the winter season, so that it may fall off from the steel plate in any of various processes including degreasing, pretreatment, and electrodeposition coating.

On the other hand, softening the base resin to improve the adhesiveness induces reduction in strength of the steel plate reinforcing sheet after cured, leading to failure to provide sufficient reinforcement.

SUMMARY OF THE INVENTION

It is the object of the invention to provide a steel plate reinforcing sheet that can provide improvement in adhesiveness as well as in reinforcement.

The present invention provides a steel plate reinforcing sheet comprising a restricting layer and a reinforcing layer, wherein the reinforcing layer is formed of foam composition comprising styrene synthetic rubber, aromatic epoxy resin, and a foaming agent.

In the steel plate reinforcing sheet of the present invention, it is preferable that the foam composition further comprises epoxy-modified styrene synthetic rubber.

In the steel plate reinforcing sheet of the present invention, it is preferable that the number average molecular weight of the styrene synthetic rubber is not less than 30,000.

In the steel plate reinforcing sheet of the present invention, it is preferable that the foam composition further comprises a rubber cross-linking agent and/or an epoxy resin curing agent.

In the steel plate reinforcing sheet of the present invention, the restricting layer comprises at least one material selected from the group consisting of glass fiber cloth, resin-impregnated glass fiber cloth, synthetic resin unwoven cloth, and metal foil.

Also, the present invention provides a steel plate reinforcing sheet comprising a restricting layer and a reinforcing layer, wherein a total thickness of the restricting layer and reinforcing layer is not more than 3.5 mm, and wherein the steel plate reinforcing sheet has adhesion at 5° C. to an oiled, cold-rolled steel plate of not less than 2.0N/25 mm and also has bending strength of not less than 18N after heated at 160° C. for twenty minutes.

The steel plate reinforcing sheet of the present invention can satisfy both of the adhesion and the reinforcement which have been incompatible with each other hitherto, ensuring both sufficient adhesion to the steel plate and sufficient reinforcement of the same steel plate. This can ensure the adhesive bonding of the steel plate reinforcing plate to steel plates used in a variety of industrial machines, and as such can allow the effective reinforcement of the steel plates by foaming the steel plate reinforcing plate bonded to the steel plate.

DETAILED DESCRIPTION OF THE INVENTION

Figure 1:
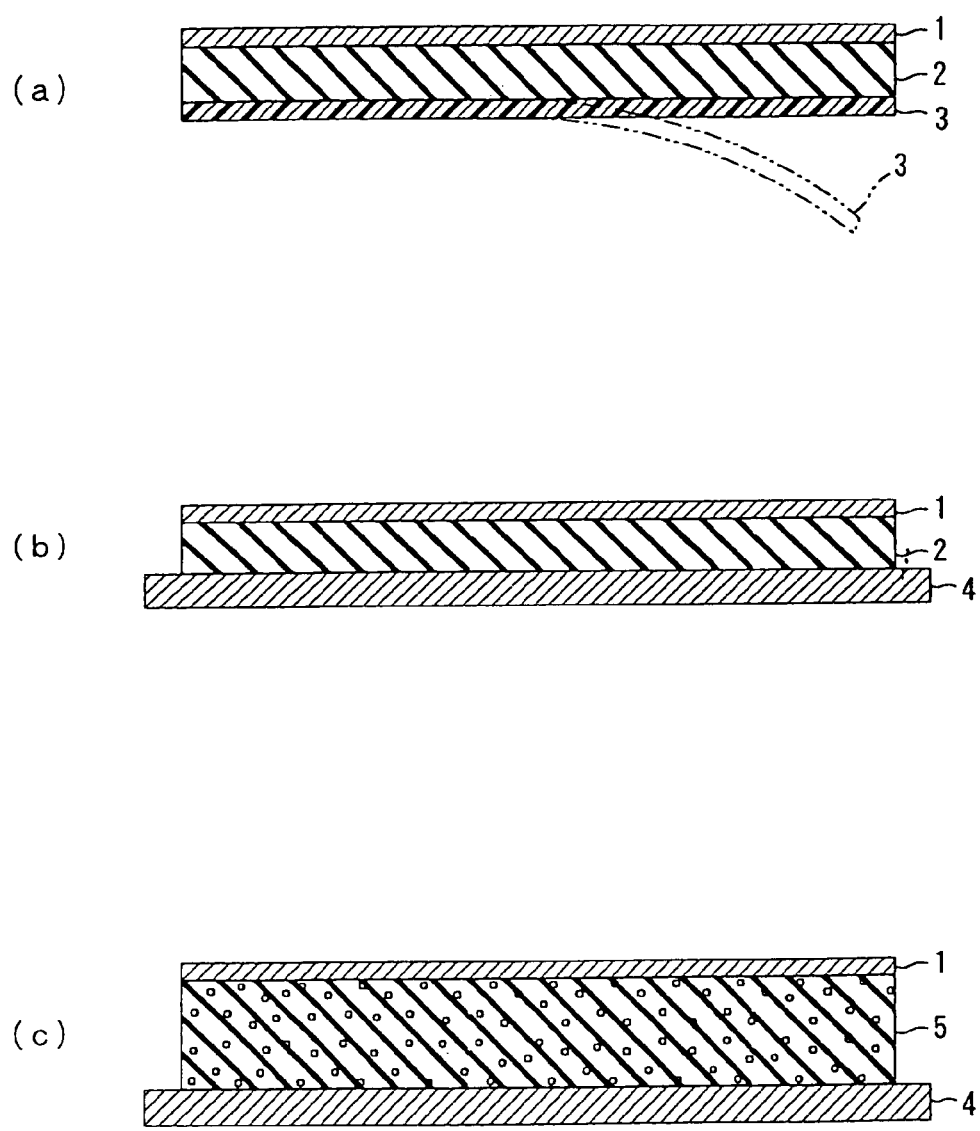
FIG. 1 is a process drawing showing an embodiment of a method of reinforcing a steel plate by using a steel plate reinforcing sheet of the present invention:
(a) illustrates the process of preparing a steel plate reinforcing sheet and peeling off an exfoliate paper from the same reinforcing sheet;
(b) illustrates the process of adhesively bonding the steel plate reinforcing plate to the steel plate and;
(c) illustrates the process of foaming the steel plate reinforcing plate by heating.

A steel plate reinforcing sheet of the present invention comprises a restricting layer and a reinforcing layer.

The restricting layer serves to provide tenacity for the reinforcing layer after foamed (hereinafter it is referred to "foam layer"). It is preferable that the restricting layer is in the form of a sheet and is formed of lightweight and thin-film material to be stuck firmly and integrally with the foam layer. The materials that may be used for the restricting layer include, for example, glass fiber cloth, resin-impregnated glass fiber cloth, synthetic resin unwoven cloth, metal foil, and carbon fiber.

The glass fiber cloth is a cloth formed of glass fibers, and a known glass fiber cloth can be used. The resin-impregnated glass fiber cloth is the above mentioned glass fiber cloth impregnated with synthetic resin such as thermosetting resin, or thermoplastic resin, and a known resin-impregnated glass fiber cloth can be used. The thermosetting resins that may be used include, for example, epoxy resin, urethane resin, melamine resin, and phenol resin. The thermoplastic resins that may be used include, for example, vinyl acetate resin, ethylene vinyl acetate copolymer (EVA), vinyl chloride resin, and EVA-vinyl chloride resin copolymer. The thermosetting resin cited above and the thermoplastic resin cited above may be used in combination (e.g. combination of melamine resin and vinyl acetate resin).

The metal foils that may be used include, for example, known metal foils such as an aluminum foil and a steel foil.

Of these materials, the glass fiber cloth and the resin-impregnated glass fiber cloth are preferably used, in terms of weight, degree of adhesion, strength, and cost.

The restricting layer has a thickness, for example, in the range of 0.05 to 0.40 mm, or preferably in the range of 0.10-0.30 mm.

The reinforcing layer is in the form of a sheet of foam composition which is foamed by heating. The foaming composition comprises at least a rubber, an epoxy resin and a foaming agent.

No particular limitation is imposed on the rubber. The rubbers that may be used include, for example, styrene synthetic rubber, such as styrene-butadiene rubber (e.g. styrene-butadiene random copolymer, styrene-butadiene-styrene block copolymer, styrene-ethylene-butadiene copolymer, and styrene-ethylene-butadiene-styrene block copolymer), styrene-isoprene rubber (e.g. styrene-isoprene-styrene block copolymer), and styrene-isoprene-butadiene rubber, and polybutadiene rubber (1,4-polybutadiene rubber, the same applies to the following), syndioctactic-1,2-polybutadiene rubber, acrylonitrile-butadiene rubber, polyisoprene rubber, chloroprene rubber, isobutylene-isoprene rubber, nitrile rubber, butyle rubber, and natural rubber. These rubbers may be used alone or in combination. Of these rubbers, styrene synthetic rubber, or preferably styrene-butadiene rubber, is preferably used in terms of reinforcement and adhesion to an oiled surface of the steel plate.

The term "styrene synthetic rubber" here is a synthetic rubber containing styrene of raw material as a molecular building unit in a molecular chain and containing not more than 50 weight % styrene, or preferably not more than 35 weight % styrene. The styrene content of more than this may induce reduction of adhesion of the steel plate reinforcing sheet under low temperature.

The number average molecular weight of this rubber is not less than 30,000, or preferably ranges from 50,000 to 1,000,000. The number of average molecular weight of less than 30,000 may induce reduction of adhesion of the steel plate reinforcing sheet particularly to the oiled steel plate.

Also, the Mooney viscosity of this rubber ranges for example from 20 to 60 (ML1+4, at 100° C.), or preferably from 30 to 50 (ML1+4, at 100° C.).

The mixing ratio of this rubber is for example in the range of 30-70 parts by weight, or preferably 40-60 parts by weight, per 100 parts by weight of the total of rubber and epoxy resin. The mixing ratio of the rubber of less than that may induce reduction of adhesion of the steel plate reinforcing sheet particularly to the oiled steel plate. On the other hand, the mixing ratio of the rubber of more than that may induce reduction of reinforcement of the steel plate reinforcing sheet.

No particular limitation is imposed on the epoxy resin. The epoxy resins that may be used include, for example, aromatic epoxy resin, such as bisphenol epoxy resin (e.g. bisphenol A type epoxy resin, dimer acid modified bisphenol A type epoxy resin, bisphenol F type epoxy resin, bisphenol S type epoxy resin, etc.), novolak epoxy resin (e.g. phenol novolak epoxy resin, cresol novolak epoxy resin, etc.), and naphthalene epoxy resin, cyclo aliphatic epoxy resin, ring containing nitrogen epoxy resin, such as triglycidyl isocyanurate and hydantoin epoxy resin, hydrogenated bisphenol A type epoxy resin, aliphatic epoxy resin, glycidyl ether epoxy resin, biphenyl epoxy resin of a mainstream of low water absorption curing type, dicyclo ring type epoxy resin. These may be used alone or in combination. Of these epoxy resins, aromatic epoxy resin, especially, bisphenol epoxy resin is preferably used, in terms of reinforcements. The term "aromatic epoxy resin" here is an epoxy resin containing a benzene ring as a molecular building unit in a molecular chain.

Epoxy equivalent of this epoxy resin is for example in the range of 150-1,000 g/eqiv., or preferably in the range of 200-800 g/equiv. The epoxy equivalent can be calculated from concentration of oxirane oxygen measured by the titration using hydrogen bromide.

The mixing ratio of the epoxy resin is for example in the range of 30-70 parts by weight, or preferably 40-60 parts by weight, per 100 parts by weight of the total of rubber and epoxy resin. The mixing ratio of the epoxy resin of less than that may induce reduction of reinforcement of the steel plate reinforcing sheet. On the other hand, the mixing ratio of the epoxy resin of more than that may induce reduction of adhesion of the steel plate reinforcing sheet to the oiled steel plate.

The foaming agents that may be used include, for example, an inorganic foaming agent and an organic foaming agent.

The inorganic foaming agents that may be used include, for example, ammonium carbonate, ammonium hydrogen carbonate, sodium hydrogen carbonate, ammonium nitrite, sodium borohydride, and azides.

The organic foaming agents that may be used include, for example, an N-nitroso compound (N,N'-dinitrosopentamethylenetetramine, N,N'-dimethyl-N,N'-dinitrosoterephthalamide, etc.), an azoic compound (e.g. azobis (isobutyronitrile), azodicarboxylic amide, barium azodicarboxylate, etc.), alkane fluoride (e.g. trichloromonofluoromethane, dichloromonofluoromethane, etc.), a hydrazine compound (e.g. paratoluene sulfonyl hydrazide, diphenylsulfone-3,3'-disulfonyl hydrazide, 4,4'-oxybis (benzene sulfonyl hydrazide), allylbis (sulfonyl hydrazide), etc.), a semicarbazide compound (e.g. p-toluylenesulfonyl semicarbazide, 4,4'-oxybis (benzene sulfonyl semicarbazide, etc.), and a triazole compound (e.g. 5-morphoryl-1,2,3,4-thiatriazole, etc.).

The foaming agents may be in the form of thermally expansible microparticles comprising microcapsules formed by encapsulating thermally expansive material (e.g. isobutane, pentane, etc.) in a microcapsule of thermoplastic resin, such as vinylidene chloride, acrylonitrile, acrylic ester and methacrylic ester). Commercially available products, such as Microsphere® (available from Matsumoto Yushi-Seiyaku Co., Ltd.), may be used as the thermally expansible microparticles.

These may be used alone or in combination. Of these foaming agents, 4,4'-oxybis (benzene sulfonyl hydrazide) is preferably used in terms of less susceptible to external factors and foaming stability.

The mixing ratio of the foaming agent is for example in the range of 0.5-10 parts by weight, or preferably 1-5 parts by weight, per 100 parts by weight of the total of rubber and epoxy resin. The mixing ratio of the foaming agent of less than that may induce insufficient foaming, so that it causes reduction in thickness and thus in reinforcement of the steel plate reinforcing sheet. On the other hand, the mixing ratio of the foaming agent of more than that may induce reduction of density and thus in reinforcement of the steel plate reinforcing sheet.

It is preferable that the foam composition includes a compatibilizing agent, in addition to the component cited above. The compatibilizing agent is used to compatibilize the rubber and the epoxy resin cited above. The mixing of the compatibilizing agent can provide further improved adhesiveness and reinforcement.

No particular limitation is imposed on the compatibilizing agent. For example, epoxy-modified rubber, or preferably epoxy-modified styrene synthetic rubber, can be cited as the compatibilizing agent. The term "epoxy-modified rubber (epoxy-modified styrene synthetic rubber)" here is a rubber (a synthetic rubber) which is produced by modifying the rubber (the styrene synthetic rubber) at an end of molecular chain or in a molecular chain thereof with an epoxy group. Epoxy equivalent of the epoxy-modified rubber preferably used is for example in the range of 100-10,000 g/eqiv., or preferably in the range of 400-3,000 g/equiv. The rubber (styrene synthetic rubber) can be modified with an epoxy group by using a known method. For example, an epoxidizing agent, such as peracids and hydroperoxides, is allowed to react with a double bond in the rubber (styrene synthetic rubber) in an inert solvent.

The epoxy-modified rubbers (epoxy-modified styrene synthetic rubbers) that may be used include, for example, epoxy-modified rubber wherein an epoxy group is introduced in a B polymer block of an A-B type block copolymer or an A-B-A type block copolymer (A represents a styrene polymer block, and B represents conjugated diene polymer block, such as a butadiene polymer block and an isoprene polymer block).

To be more specific, for example, epoxy-modified styrene•butadiene•styrene block copolymer, epoxy-modified styrene•ethylene•butadiene•styrene block copolymer, and epoxy-modified styrene•isoprene•styrene block copolymer can be used. These may be used alone or in combination.

Of these epoxy-modified rubbers (epoxy-modified styrene synthetic rubbers), epoxy-modified styrene•butadien•styrene block copolymer is preferably used in terms of ensuring the compatibility of the reinforcement with the adhesiveness.

In the A-B type block copolymer or the A-B-A type block copolymer, it is preferable that the weight average molecular weight of an A block copolymer, which is a styrene copolymer block, is on the order of 1,000 to 10,000, and the glass-transition temperature of the same is 7° C. or more. Also, it is preferable that the weight average molecular weight of a B block copolymer, which is a conjugated diene polymer block, is on the order of 10,000 to 500,000, and the glass-transition temperature of the same is −20° C. or less. It is preferable that a weight ratio of the A block copolymer to the B block copolymer (A block copolymer/B block copolymer) is in the range of 2/98-50/50, or preferably in the range of 15/85-30/70.

The mixing ratio of the compatibilizing agent is for example in the range of 1-20 parts by weight, or preferably 5-15 parts by weight, per 100 parts by weight of the total of rubber and epoxy resin. The mixing ratio of the compatibilizing agent of less than this may not produce improvement in reinforcement and adhesiveness of the steel plate reinforcing sheet. On the other hand, the mixing ratio of the compatibilizing agent of more than this may induce reduction of adhesion of the steel plate reinforcing sheet under a low temperature in particular.

Further, it is preferable that this foam composition includes a rubber cross-linking agent and/or an epoxy resin curing agent, in addition to the components cited above. The containing of the rubber cross-linking agent and/or the epoxy resin curing agent can provide improved reinforcement.

A known rubber cross-linking agent (a vulcanizing agent) that can allow to cross-link the rubber or the epoxy-modified rubber can be used as the rubber cross-linking agent. The rubber cross-linking agents that may be used include, for example, sulfur, sulfur compounds, selenium, magnesium oxide, lead monoxide, organic peroxides (e.g. dicumyl peroxide, 1,1-ditert-butyl-peroxy-3,3-5-trimethylcyclohexane, 2,5-dimethyl-2,5-ditert-butyl-peroxyhexane, 2,5-dimethyl-2,5-ditert-butyl-peroxyhexyne, 1,3-bis (tert-butyl-peroxy-isopropyl) benzene, tert-butyl-peroxy-ketone, and tert-butyl-peroxy-benzoate), polyamines, oximes (e.g. p-quione dioxime and p,p'-dibenzoyl quinone dioxime, etc.), nitroso compounds (e.g. p-dinitroso benzene, etc.), resins (e.g. alkyl phenol-formaldehyde resin, melamine-formaldehyde condensate), and ammonium salts (e.g. ammonium benzoate, etc.).

These may be used alone or in combination. Of these rubber cross-linking agents, sulfur is preferably used in terms of the curing property and the reinforcement.

The mixing ratio of the rubber cross-linking agent is for example in the range of 1-20 parts by weight, or preferably 2-15 parts by weight, per 100 parts by weight of the total of rubber and epoxy resin. The mixing ratio of the rubber cross-linking agent of less than this may induce reduction in reinforcement. On the other hand, the mixing ratio of the rubber cross-linking agent of more than this may induce reduction of adhesion of the steel plate reinforcing sheet and may induce cost-defectiveness.

A known epoxy resin curing agent can be used as the epoxy resin curing agent. The epoxy resin curing agents that may be used include, for example, amine compounds, acid anhydride compounds, amide compounds, hydrazide compounds, imidazole compounds, and imidazoline compounds. In addition to these, phenol compounds, urea compounds, and polysulfide compounds can be cited as the epoxy resin curing agent.

The amine compounds that may be used include, for example, ethylenediamine, propylenediamine, diethylenetriamine, triethylenetetramine, amine adducts thereof, metaphenylenediamine, diaminodiphenylmethane, and diaminodiphenylsulfone.

The acid anhydride compounds that may be used include, for example, phthalic anhydride, maleic anhydride, tetrahydrophthalic anhydride, hexahydrophthalic anhydride, methyl nadic anhydride, pyromellitic anhydride, dodecenylsuccinic anhydride, dichlorosuccinic anhydride, benzophenonetetracarboxylic anhydride, and chlorendic anhydride.

The amide compounds that may be used include, for example, dicyandiamide and polyamide.

The hydrazide compounds that may be used include, for example, dihydrazide.

The imidazole compounds that may be used include, for example, methyl imidazole, 2-ethyl-4-methyl imidazole, ethyl imidazole, isopropyl imidazole, 2,4-dimethylimidazole, phenylimidazole, undecylimidazole, heptadecylimidazole, and 2-phenyl-4-methylimidazole.

The imidazoline compounds that may be used include, for example, methylimidazoline, 2-ethyl-4-methylimidazoline, ethylimidazoline, isopropylimidazoline, 2,4-dimehtylimidazoline, phenylimidazoline, undecylimidazoline, heptadecylimidazoline, and 2-phenyl-4-methyl imidazoline.

These may be used alone or in combination. Of these epoxy resin curing agents, dicyandiamide is preferably used in terms of adhesiveness.

The mixing ratio of the epoxy resin curing agent is for example in the range of 0.5-15 parts by weight, or preferably 1-10 parts by weight, per 100 parts by weight of the total of rubber and epoxy resin. The mixing ratio of the epoxy resin curing agent of less than this may induce reduction in reinforcement. On the other hand, the mixing ratio of the epoxy resin curing agent of more than this may induce reduction in storage stability.

In addition to the components cited above, a foam auxiliary agent, a cross-linking accelerator, a curing accelerator, a filler, and a tackifier may be included in the foam composition. Further, if desired, known additive, such as, for example, pigment (e.g. carbon black, etc.), a thixotropic agent (e.g. montmorillonite, etc.), lubricant (e.g. stearic acid, etc.), an antiscorching agent, a stabilization agent, a softening agent, a plasticizer, an antiaging agent, an antioxidant, an ultraviolet absorber, a coloring agent, a mildewproofing agent, and a fire retardant, may be included in the foam composition in a proper proportion.

The foam auxiliary agents that may be used include, for example, zinc stearate, a urea compound, a salicyclic compound, and a benzoic compound. These foam auxiliary agents may be used alone or in combination. The mixing ratio of the foam auxiliary agent is for example in the range of 0.5-10 parts by weight, or preferably 1-5 parts by weight, per 100 parts by weight of the total of rubber and epoxy resin.

The cross-linking accelerators that may be used include, for example, zinc oxide, dithiocarbamic acids, thiazoles, guanidines, sulfenamides, thiurams, xanthogenic acids, aldehyde ammonias, aldehyde amines, and thioureas. These cross-linking accelerators may be used alone or in combination. The mixing ratio of the cross-linking accelerator is for example in the range of 1-20 parts by weight, or preferably 3-15 parts by weight, per 100 parts by weight of the total of rubber and epoxy resin.

The curing accelerators that may be used include, for example, imidazoles, tertiary amines, phosphorus compounds, quaternary ammonium salts, and organic metal salts. These curing accelerators may be used alone or in combination. The mixing ratio of the curing accelerator is for example in the range of 0.5-20 parts by weight, or preferably 1-10 parts by weight, per 100 parts by weight of the total of rubber and epoxy resin.

The fillers that may be used include, for example, calcium carbonate (e.g. calcium carbonate heavy, calcium carbonate light, and Hakuenka® (colloidal calcium carbonate), etc.), talc, mica, clay, mica powder, bentonite, silica, alumina, aluminum silicate, titanium oxide, acetylene black, and aluminum powder. These fillers may be used alone or in combination. The mixing ratio of the filler is for example in the range of 50-150 parts by weight, or preferably 75-125 parts by weight, per 100 parts by weight of the total of rubber and epoxy resin.

The tackifiers that may be used include, for example, rosin resin, terpene resin (e.g. terpene-aromatic liquid resin, etc.), coumarone-indene resin, and petroleum resin (e.g. C5/C9 petroleum resin). These tackifiers may be used alone or in combination. The mixing ratio of the tackifier is for example in the range of 10-200 parts by weight, or preferably 20-150 parts by weight, per 100 parts by weight of the total of rubber and epoxy resin.

The foam composition can be prepared in the form of kneaded material by mixing the components cited above in the mixing ratios specified above and kneading them by using a mixing roll, a pressure kneader, or an extruder, for example, through not limited thereto.

It is preferable that the kneaded material thus obtained is prepared to have a flow tester viscosity (60° C., 24 kg load) for example in the range of 1,000-5,000 Pa·s, or preferably in the range of 1,500-4,000 Pa·s.

Thereafter, the kneaded material is rolled for example by calendaring, extrusion or press molding under temperature under which the foaming agent is not substantially decomposed, to form the reinforcing layer, though this is not particularly limitative. Then, the reinforcing layer thus formed is adhesively bonded to the restricting layer. The steel plate reinforcing sheet is produced in this manner.

The reinforcing layer thus produced has a thickness for example in the range of 0.2-3.0 mm, or preferably in the range of 0.5-1.3 mm.

If desired, an exfoliate paper is stuck on the surface of reinforcing layer of the steel plate reinforcing sheet.

In the steel plate reinforcing sheet thus obtained, it is preferable that a volume expansion ratio of the foam composition used as the reinforcing layer ranges preferably from 1.5 to 4.0 times, or further preferably from 2.0 to 3.5 times, when foamed. It is preferable that a density of the foam in the foam layer (weight (g) of foam/volume of foam ($g/cm^3$)) is for example in the range of preferably 0.2-0.8 $g/cm^3$, or further preferably in the range of 0.3-0.7 $g/cm^3$.

In the steel plate reinforcing sheet of the present invention, the total thickness of the restricting layer and reinforcing layer thus adhesively bonded together is set to be not more than 3.5 mm (generally 0.3 mm or more), preferably in the range of 0.3-3.4 mm, or further preferably in the range of 0.6-1.6 mm. The total thickness of the both layers of more than 3.5 mm induces increase in thickness and weight, thus inducing cost-defectiveness. On the other hand, the total thickness of less than 0.3 mm may induce insufficient reinforcement.

The steel plate reinforcing sheet of the present invention has adhesion at 5° C. to the oiled, cold-rolled steel plate of not less than 2.0N/25 mm, or preferably in the range of 3.0-10N/25 mm, and has bending strength of not less than 18N, or preferably in the range of 18-50N, after heated at 160° C. for twenty minutes.

When the steel plate reinforcing sheet has the adhesion of less than 2.0N/25 mm, the steel plate reinforcing sheet is easily peeled off from the steel plate. Also, when it has the bending strength of less than 18N after heated at 160° C. for twenty minutes, it cannot provide the sufficient reinforcement.

These facts indicate that when the steel plate reinforcing sheet is formed to have the total thickness of the restricting layer and reinforcing layer of not more than 3.5 mm, the adhesion at 5° C. to the oiled, cold-rolled steel plate of less than 2.0N/25 mm, and the bending strength of not less than 18N after heated at 160° C. for twenty minutes, the steel plate reinforcing sheet can be improved in adhesion particularly to the oiled steel plate in the winter season, so that it can be well prevented from falling off from the steel plate in any of various processes including degreasing, pretreatment, and electrodeposition coating and can also provide the sufficient reinforcement for the steel plate.

The adhesion and the bending strength which fall in their respective ranges specified above can be obtained by properly selecting the prescription of the foam composition from the above. It is particularly preferable that the foam composition is prepared by a blending prescription including 30-70 parts by weight of rubber, 70-30 parts by weight of epoxy resin, 0.5-10 parts by weight of foaming agent, 1-20 parts by weight of compatibilizing agent, 1-20 parts by weight of rubber cross-linking agent, 0-10 parts by weight of epoxy resin curing agent (arbitrary component), 1-20 parts by weight of cross-linking accelerator, 50-150 parts by weight of filler, 1-40 parts by weight of terpene resin, and 20-80 parts by weight of C5/C9 petroleum resin.

The steel plate reinforcing plate of the present invention thus obtained is adhesively bonded to the steel plate used in a variety of industrial machines such as transportation machines, for the reinforcement purpose. To be more specific, as shown in FIG. 1(a), the steel plate reinforcing sheet of the present invention is formed by laminating the reinforcing layer 2 on the restricting layer 1 and, if desired, the exfoliate paper 3 is stuck on the surface of the reinforcing layer 2. In use, the exfoliate paper 3 is stripped from the surface of the reinforcing layer 2, as indicated by a phantom line, first. Then, the surface of the reinforcing layer 2 is adhesively bonded to the steel plate 4, as shown in FIG. 1(b). Thereafter, the resulting lamination is heated at a prescribed temperature (e.g. 160-210° C.) to foam, to crosslink, and to cure the reinforcing layer 2, to thereby form the foam layer 5, as shown in FIG. 1(c).

This steel plate reinforcing sheet of the present invention can be suitably applied for reinforcement of a steel panel of a shell of an automobile for which weight saving is required. In this application to the automotive vehicle, the steel plate reinforcing sheet is adhesively bonded to the steel panel, first, in an assembling process of the steel panel of the shell of the automobile, for example. Then, the steel plate reinforcing sheet adhesively bonded to the steel panel is thermally foamed, cross-linked and cured by using the heat generated at the time of the electrodeposition coating, to thereby form the foam layer.

The steel plate reinforcing sheet of the present invention can sufficiently develop the adhesion to an irregularly curved surface, such as a two-dimensionally or three-dimensionally curved surface. Also, the steel plate reinforcing sheet of the present invention can sufficiently develop the adhesion to the steel plate in low temperature of the winter season as well. Besides, the steel plate reinforcing sheet of the present invention can sufficiently develop the reinforcement property after heated to be foamed.

In addition, the steel plate reinforcing sheet of the present invention can sufficiently develop the adhesion to the oiled steel plate in the winder season as well.

Thus, the steel plate reinforcing sheet of the present invention can satisfy both of the adhesion and the reinforcement which have been incompatible with each other hitherto, ensuring both of the sufficient adhesion to the steel plate and the sufficient reinforcement of the steel plate.

EXAMPLES

While in the following, the present invention will be described in further detail with reference to Examples and Comparative Example, the present invention is not limited to any of them.

Test Example 1

A) Examples and Comparative Examples

After the respective components were blended in the blending prescription shown in TABLE 1, they were kneaded by a 10 inch mixing rolls to prepare the kneaded material. In this kneading process, the resin components (at least any of SBR1, SBR2, BR, Epoxy resin, and Epoxy-modified SBS), the filler component (at least either of calcium carbonate heavy and talc), and the tackifier component (at last either of terpene-aromatic liquid resin and C5/C9 petroleum resin) were kneaded at 130° C. Then, the foaming agent, the sulfur, the epoxy resin curing agent, the zinc oxide, and the cross-linking accelerator were mixed in the kneaded material and kneaded at 20° C.

The resulting kneaded material was rolled into a sheet form of 0.6 mm thick by using the calendar roll, to form the reinforcing layer. Then, the glass fiber cloth of 0.2 mm thick serving as the restricting layer was stuck on one side of the reinforcing layer and the exfoliate paper was stuck on the other side of the reinforcing layer opposite to the side thereof on which the restricting layer was stuck. The steel plate reinforcing sheet was produced in this manner.

B) Evaluation

The reinforcing effect and the adhesiveness of the obtained steel plate reinforcing sheet to an oiled steel plate at low temperature were evaluated. These evaluations were carried out for all Examples and Comparative Examples. The results are shown in TABLE 1.

1) Test on Reinforcing Effect

After the exfoliate paper of the steel plate reinforcing sheet was peeled off, the steel plate reinforcing sheet was adhesively bonded to an oiled, cold-rolled steel plate (SPCC-SD available from Nippon Testpanel Co., Ltd.) having 25 mm wide, 150 mm long, and 0.8 mm thick under an atmosphere of 20° C. Then, it was heated at 160° C. for 20 minutes to foam the reinforcing layer. The test piece was obtained in this manner. The same operation was carried out for all Examples and Comparative Examples.

Then, after the test piece was supported with a span of 100 mm, with the steel plate up, a testing bar was moved down on a lengthwise center portion of the test piece from above in a vertical direction at a rate of compression of 1 mm/min. and was pressed down against the steel plate until the foam layer was bent or displaced by 1 mm from its original position. The strength caused by this bend of the foam layer was taken as a bending strength (N), which was evaluated as the reinforcing effect.

2) Test on Adhesiveness to Oiled Steel Plate at Low Temperature

After the oiled, cold-rolled steel plate (SPCC-SD available from Nippon Testpanel Co., Ltd.) was prepared, a rust-preventive agent (Daphne Oil Z-5 available from IDEMITSU KOSAN CO., LTD.) was applied to a surface of the oiled steel place. Then, the resulting steel plate was rested in an upright position at 20° C. for the duration of a night. This steel plate was prepared for each of Examples and Comparative Examples. Thereafter, the steel plate reinforcing sheet was cut into pieces of 25 mm wide and then the exfoliate paper was peeled off therefrom. Then, the respective pieces of the steel plate reinforcing sheet were press-contacted with the rust-preventive-agent-applied surfaces of the respective steel plates by rollers of 2 kg under the atmosphere of 5° C. After 30 minutes passed, a 90° peel test (tensile speed: 300 mm/min.) was carried out to measure the adhesion (N/25 mm), and the measured values were evaluated as the adhesiveness to oiled steel plate at low temperature.

TABLE 1

| Example/ Comparative Example | Ex. 1 | Com- para. Ex. 1.2 | Com- para. Ex. 1.3 | Com- para. Ex. 1 | Com- para. Ex. 2 | Com- para. Ex. 3 |
|---|---|---|---|---|---|---|
| Blending prescription of foam composition | | | | | | |
| SBR1 | 50 | 50 | 0 | 0 | 100 | 0 |
| SBR2 | 0 | 0 | 50 | 0 | 0 | 0 |
| BR | 0 | 0 | 0 | 50 | 0 | 0 |
| Epoxy resin | 50 | 50 | 50 | 50 | 0 | 100 |
| Epoxy-modified SBS | 10 | 0 | 0 | 0 | 0 | 0 |
| Foaming agent | 2 | 2 | 2 | 2 | 2 | 2 |
| Sulfur (Rubber cross-linking agent) | 10 | 10 | 10 | 10 | 10 | 10 |
| Epoxy resin curing agent | 5 | 5 | 5 | 5 | 5 | 5 |
| Zinc oxide (Cross-linking accelerator) | 5 | 5 | 5 | 5 | 5 | 5 |
| Cross-linking accelerator | 5 | 5 | 5 | 5 | 5 | 5 |
| Calcium carbonate heavy (Filler) | 50 | 50 | 50 | 50 | 50 | 50 |
| Talc (Filler) | 50 | 50 | 50 | 50 | 50 | 50 |
| Terpene-aromatic liquid resin (Tackifier) | 10 | 10 | 10 | 10 | 10 | 10 |
| C5/C9 petroleum resin (Tackifier) | 30 | 30 | 30 | 30 | 30 | 30 |
| Evaluation | | | | | | |
| Reinforcing effect (N) | 21.8 | 18.0 | 25.0 | 10.0 | 11.0 | 35.0 |
| Adhesiveness to oiled steel plate at low temperature (N/25 mm) | 4.5 | 3.0 | 2.1 | 0.56 | 4.7 | 0.8 |

SBR 1: Styrene-butadiene random copolymer of 240,000 in number average molecular weight, 25 weight % styrene content, and 35 in Mooney viscosity (ML1+4, at 100° C.),
SBR 2: Styrene-butadiene random copolymer of 110,000 in number average molecular weight, 46 weight % styrene content, and 45 in Mooney viscosity (ML1+4, at 100° C.),
BR: Syndioctactic-1,2-polybutadiene of 3 in MFR (g/19 min. at 150° C.), and 95° C. in melting point,
Epoxy resin: Semisolid bisphenol A type epoxy resin of 250 g/eqiv. in epoxy equivalent,
Epoxy-modified SBS: Epoxy-modified styrene·butadiene·styrene block copolymer of 40 weight % styrene content, and 1,067 g/eqiv. in epoxy equivalent (EPOFRIEND® AT501 available from DAICEL CHEMICAL INDUSTRIES, LTD.)
Foaming agent: 4,4'-oxybis (benzene sulfonyl hydrazide)
Epoxy resin curing agent: Dicyandiamide,
Cross-linking accelerator: Dibenzothiazyl disulfide.

It can be seen from TABLE 1 that Comparative Example 3 comprising epoxy resin only provides a good result in reinforcement but provides a bad result in adhesiveness at low temperature; that Comparative Example 2 comprising SBR1 only provides a good result in adhesiveness at low temperature but provides a bad result in reinforcement; that Comparative Example 1 comprising BR and epoxy resin provides a bad result in compatibility of BR with epoxy resin, due to which the bleeding of epoxy resin is found, and also provides bad results in reinforcement and adhesiveness at low temperature.

In contrast to this, it can be seen therefrom that Example 1 and Comparative examples 1.2 and 1.3 provide good results in reinforcement as well as in adhesiveness at low temperature, and Example 1, in particular, mixing the epoxy-modified SBS in its composition provides a good result.

Test Comparative Example 1.2

A) Examples and Comparative Examples

After the respective components were blended in the blending prescription shown in TABLE 2, they were kneaded by the 10 inch mixing rolls to prepare the kneaded material. In this kneading process, the resin components (at least any of SBR, Epoxy resins A-C, and Epoxy-modified SBS), the filler components (at least either of calcium carbonate heavy and talc), and the tackifier components (at last either of terpene-aromatic liquid resin and C5/C9 petroleum resin) were kneaded at 130° C. Then, the foaming agent, the sulfur, the epoxy resin curing agent, the zinc oxide, and the cross-linking accelerator were mixed in the kneaded material and kneaded at 20° C.

With the resulting kneaded material as the reinforcing layer, the glass fiber cloth of 0.2 mm thick serving as the restricting layer was stuck on the reinforcing layer by using a heat press to be 0.8 mm in a total thickness of the reinforcing layer and restricting layer. Also, the exfoliate paper was stuck on the other side of the reinforcing layer opposite to the side thereof on which the restricting layer was stuck. The steel plate reinforcing sheet was produced in this manner.

B) Evaluation

The reinforcing effects (bending strength and impact-resistance) and the adhesiveness to the oiled steel plate at low temperature were evaluated. These evaluations were carried out for all Examples and Comparative Examples. The results are shown in TABLE 2.
1) Test on Reinforcing Effect
After the exfoliate paper of the steel plate reinforcing sheet was peeled off, the steel plate reinforcing sheet was adhesively bonded to the oiled, cold-rolled steel plate (SPCC-SD available from Nippon Testpanel Co., Ltd.) having 25 mm wide, 150 mm long, and 0.8 mm thick under the atmosphere of 20° C. Then, it was heated at 160° C. for 20 minutes to foam the reinforcing layer. The test piece was obtained in this manner. The same operation was carried out for all Examples and Comparative Examples.

Then, after the test piece was supported with the span of 100 mm, with the steel plate up, the testing bar was moved down on the lengthwise center portion of the test piece from above in a vertical direction at a rate of compression of 1 mm/min. and was pressed down against the steel plate until the foam layer was bent or displaced by 1 mm from its original position. The strength caused by this bend of the foam layer was taken as the bending strength (N), which was evaluated as the reinforcing effect.
2) Test on Impact Resistance (Slamming Test)
The steel plate reinforcing sheet was cut into pieces of 50 mm wide and 100 mm long and then the exfoliate paper was peeled off therefrom. Then, the pieces of the steel plate reinforcing sheet were adhesively bonded to a center portion of a test steel plate having 200 mm wide, 300 mm long, and 0.8 mm thick and press-contacted with the steel plate for five seconds so that the pressure of 5.9 KPa was applied on the entire areas of the pieces. The samples were prepared in this manner.

Then, the samples were set in a slamming machine and were tested to observe peeling, slippage, or lifting of the steel plate reinforcing sheet, giving an impact to the samples from an angle of 10°, in conformity with the testing method described in JIS K6830. The impact was given to the same sample repeatedly ten times at the same angle during which no peeling, slippage or lifting was observed. When no peeling, slippage or lifting was observed during this time, the same sample was tested further in the same manner, with the angle increased by 10°, one for each ten times. This test was repeatedly carried out until the angle reaches the maximum angle of 90°. The angle at which the peeling, slippage or lifting was generated and the number of times the test was carried out until then were measured and the measured values were evaluated as the impact resistance (it is to be noted that 90° or 10 times indicate that no peeling, slippage or lifting was generated).

3) Test on Adhesiveness to Oiled Steel Plate at Low Temperature

After the oiled, cold-rolled steel plate (SPCC-SD available from Nippon Testpanel Co., Ltd.) was prepared, the rust-preventive agent (Daphne Oil Z-5 available from IDEMITSU KOSAN CO., LTD.) was applied to the surface of the oiled steel place. Then, the resulting steel plate was rested in an upright position at 20° C. for the duration of a night. This steel plate was prepared for each of Examples and Comparative Examples.

Thereafter, the steel plate reinforcing sheet was cut into pieces of 25 mm wide and then the exfoliate paper was peeled off therefrom. Then, the respective pieces of the steel plate reinforcing sheet were press-contacted with the rust-preventive-agent-applied surfaces of the respective steel plates by the rollers of 2 kg under the atmosphere of 5° C. After 30 minutes passed, the 90° peel test (tensile speed: 300 mm/min.) was carried out to measure the adhesion (N/25 mm), and the measured values were evaluated as the adhesiveness to oiled steel plate at low temperature.

TABLE 2

| Example/Comparative Example | Ex. 4 | Ex. 5 | Ex. 6 | Compara. Ex. 4 | Compara. Ex. 5 |
|---|---|---|---|---|---|
| Blending prescription of foam composition | | | | | |
| SBR | 50 | 60 | 50 | 0 | 100 |
| Epoxy resin    A | 50 | 40 | 0 | 100 | 0 |
|                         B | 0 | 0 | 25 | 0 | 0 |
|                         C | 0 | 0 | 25 | 0 | 0 |
| Epoxy-modified SBS | 10 | 10 | 10 | 0 | 0 |
| Foaming agent | 2 | 2 | 2 | 2 | 2 |
| Sulfur (Rubber cross-linking agent) | 10 | 10 | 10 | 10 | 10 |
| Epoxy resin curing agent | 5 | 5 | 5 | 5 | 5 |
| Zinc oxide (Cross-linking accelerator) | 5 | 5 | 5 | 5 | 5 |
| Cross-linking accelerator | 5 | 5 | 5 | 5 | 5 |
| Calcium carbonate heavy (Filler) | 50 | 50 | 50 | 50 | 50 |
| Talc (Filler) | 50 | 50 | 50 | 50 | 50 |
| Terpene-aromatic liquid resin | 10 | 10 | 10 | 10 | 10 |

TABLE 2-continued

| Example/Comparative Example | Ex. 4 | Ex. 5 | Ex. 6 | Compara. Ex. 4 | Compara. Ex. 5 |
|---|---|---|---|---|---|
| (Tackifier) C5/C9 petroleum resin (Tackifier) | 30 | 30 | 30 | 30 | 30 |
| Evaluation | | | | | |
| Reinforcing effect (N) | 21.8 | 20.2 | 21.0 | 35.0 | 11.0 |
| Impact resistance (Angle, Number of times) | 90°, 10 times | 90°, 10 times | 90°, 10 times | 60°, 3 times | 90°, 10 times |
| Adhesiveness to oiled steel plate at low temperature (N/25 mm) | 4.5 | 5.3 | 4.3 | 0.8 | 4.7 |

Details in TALBE 2 are given below.

SBR: Styrene-butadiene random copolymer of 240,000 in number average molecular weight, 25 weight % styrene content, and 35 in Mooney viscosity (ML1+4, at 100° C.), Epoxy resin A: Semisolid bisphenol A type epoxy resin of 250 g/eqiv. in epoxy equivalent, Epoxy resin B: Semisolid dimer-acid-modified bisphenol A type epoxy resin of 600-700 g/eqiv. in epoxy equivalent, Epoxy resin C: Solid bisphenol A type epoxy resin of 450-500 g/eqiv. in epoxy equivalent, Epoxy-modified SBS: Epoxy-modified styrene·butadiene·styrene block copolymer of 40 weight % styrene content, and 1,067 g/eqiv. in epoxy equivalent (EPOFRIEND® AT501 available from DAICEL CHEMICAL INDUSTRIES, LTD.)

Foaming agent: 4,4'-oxybis (benzene sulfonyl hydrazide)

Epoxy resin curing agent: Dicyandiamide,

Cross-linking accelerator: Dibenzothiazyl disulfide.

It can be seen from TABLE 2 that Comparative Example 4 comprising epoxy resin A only provides a good result in bending strength but provides bad results in impact resistance and adhesiveness at low temperature; and that Comparative Example 5 comprising SBR only provides a good result in adhesiveness at low temperature but provides bad results in bending strength and impact resistance.

In contrast to this, it can be seen therefrom that Examples 4-6 provide good results in reinforcement, impact resistance, and adhesiveness at low temperature.

While the illustrative embodiments of the present invention are provided in the above description, such is for illustrative purpose only and it is not to be construed restrictively. Modification and variation of the present invention that will be obvious to those skilled in the art is to be covered by the following claims.

What is claimed is:

1. A steel plate reinforcing sheet comprising:
   a restricting layer and a reinforcing layer, wherein the reinforcing layer comprises a foam composition comprising:
   a rubber comprising a styrene butadiene random copolymer,
   an aromatic epoxy resin,
   a foaming agent,
   a rubber cross-linking agent comprising sulfur,
   a tackifier,
   and an epoxy resin curing agent;

wherein the foam composition comprises about 30 to about 70 parts by weight of the rubber and about 70 to about 30 parts by weight of aromatic epoxy resin per 100 parts by weight of total of the rubber and aromatic epoxy resin, about 1 to about 20 parts by weight of sulfur and about 10 to about 200 parts by weight of tackifier per 100 parts by weight of total of the rubber and aromatic epoxy resin, and about 0.5 to about 10 parts by weight of foaming agent per 100 parts by weight of total of the rubber and aromatic epoxy resin, wherein a total thickness of the restricting layer and reinforcing layer is not more than 3.5 mm, and wherein the steel plate reinforcing sheet has adhesion of not less than 2.0N/25 mm at 5° C. to an oiled, cold-rolled steel plate and the steel plate reinforcing sheet has bending strength of not less than 18N after heating the steel plate reinforcing sheet at 160° C. for twenty minutes.

2. The steel plate reinforcing sheet according to claim 1, wherein the number average molecular weight of the styrene butadiene random copolymer is not less than 30,000.

3. The steel plate reinforcing sheet according to claim 1, wherein the restricting layer comprises at least one material selected from the group consisting of glass fiber cloth, resin-impregnated glass fiber cloth, synthetic resin unwoven cloth, and metal foil.

4. The steel plate reinforcing sheet according to claim 1, wherein the epoxy resin curing agent comprises dicyandiamide.

5. The steel plate reinforcing sheet according to claim 1, wherein the foam composition further comprises at least one component selected from the group consisting of a foam auxiliary agent, a cross-linking accelerator, a curing accelerator, a filler, a a pigment, a thixotropic agent, a lubricant, an antiscorching agent, a stabilization agent, a softening agent, a plasticizer, an antiaging agent, an antioxidant, an ultraviolet absorber, a coloring agent, a mildewproofing agent, and a fire retardant.

6. The steel plate reinforcing sheet according to claim 1, wherein the restricting layer has a thickness of about 0.05 mm to about 0.4 mm.

7. The steel plate reinforcing sheet according to claim 1, wherein the reinforcing layer has a thickness of about 0.2 mm to about 3.0 mm.

8. The steel plate reinforcing sheet according to claim 1, wherein the foaming agent is inorganic.

9. The steel plate reinforcing sheet according to claim 8, wherein the foaming agent comprises at least one agent selected from the group consisting of ammonium carbonate, ammonium hydrogen carbonate, sodium hydrogen carbonate, ammonium nitrite, sodium borohydride and azides.

10. The steel plate reinforcing sheet according to claim 1, wherein the foaming agent is organic.

11. The steel plate reinforcing sheet according to claim 10, wherein the foaming agent comprises at least one agent selected from the group consisting of an N-nitroso compound, an azoic compound, alkane fluoride, a hydrazine compound, a semicarbazide compound, and a triazole compound.

12. The steel plate reinforcing sheet according to claim 1, wherein the aromatic epoxy resin comprises bisphenol epoxy resin.

* * * * *